Patented Feb. 1, 1944

2,340,840

UNITED STATES PATENT OFFICE 2,340,840

COMPOSITION OF MATTER

John E. Wiss, Columbus, Ohio, assignor to United States Gypsum Company, Chicago, Ill., a corporation of Illinois No Drawing. Application January 11, 1941, Serial No. 374,079

13 Claims. (Cl. 51—283)

This invention relates to a composition of matter and has particular reference to a composition of matter particularly useful for embedding plate glass or similar material so that it may be subjected to grinding and polishing operations.

In the past, plate glass sheets have been embedded in stucco in order to hold the glass firmly while it is subjected to grinding and polishing operations. It has been found necessary to incorporate various materials with the stucco or calcined gypsum which is employed as the embedding medium to insure that the glass will be firmly adhered thereto when the stucco sets and further to produce a material which has reduced expansion qualities. Compositions of this nature which have been used in the past comprise calcined gypsum to which quantities of lime have been added. The lime serves to impart wetting properties to the mass so that it wets and readily adheres to the surface of the glass. The lime also functions to reduce the expansion qualities of the hardened composition to some extent. The use of lime in these stucco compositions, however, has not been entirely satisfactory for the reason that the lime in the mixture has a tendency to react directly with the carbon dioxide in the air when the material is stored before use for any considerable length of time. Calcium carbonate is thus formed and the wetting properties originally imparted to the composition by the lime are lost. Furthermore, the setting qualities of the material are disturbed by this carbonate formation within the composition.

It is therefore an object of this invention to provide a composition which readily adheres to glass and other smooth surfaces, thereby providing a means for effectively embedding glass for grinding or polishing operations.

It is a further object of this invention to provide a composition which will remain stable over relatively long periods of time.

A further object of this invention is to provide a composition which may be controlled as to its setting characteristics.

Further and additional objects will appear from the following description and the appended claims.

In accordance with one preferred embodiment of this invention, a plate glass setting composition is provided comprising a major proportion by weight of calcined gypsum and minor proportions by weight of potassium sulfate and a cementitious composition capable of liberating calcium hydroxide when treated with water, such as Portland cement. Suitable hygroscopic materials such as calcium chloride or magnesium chloride or other inorganic substances which have hygroscopic or deliquescent properties may be added to the composition if desired. Specifically, a glass setting composition prepared in accordance with this invention may comprise the following ingredients in the proportions indicated:

| | Per cent |
|---|---|
| Calcined gypsum | 96.9 to 97.3 |
| Portland cement | 2.5 |
| Potassium sulfate | 0.1 to 0.5 |
| Calcium chloride | 0.1 |

The above indicated ingredients may be combined or mixed in any convenient manner. The hygroscopic substance, that is, the calcium chloride, may, if desired, be incorporated with the gypsum prior to the time that it is subjected to the calcining operation. Likewise the Portland cement and potassium sulfate may be incorporated at such time, these ingredients being heat stable and capable of withstanding calcining temperatures. However, the composition is usually prepared as a matter of convenience by calcining the gypsum in the presence of the calcium chloride and thereafter incorporating the Portland cement and potassium sulfate with the calcined mixture. Preferably the gritty impurities normally present in calcined gypsum, such as traces of silica, limestone, or any other substances capable of marring polished glass surfaces, are present in a very finely divided condition, so that substantially 100 per cent thereof will pass through a 100 mesh screen. The fineness of the calcined gypsum particles themselves may be regulated to any desired fineness, but is preferably not substantially coarser than 20 mesh. Pure calcined gypsum is not abrasive to normal glass surfaces, being soft and readily crushed when wetted.

The calcium chloride or other hygroscopic or deliquescent material in the above indicated composition serves to stabilize the composition in respect to its consistency characteristics when the composition is mixed with water. Generally it has been found that about 0.1 per cent is sufficient although any desired amounts of up to about 1.0 per cent may be employed. The finely divided Portland cement in the mixture may range from 0.5 to 10.0 per cent. This ingredient of the composition liberates quantities of lime when the composition is mixed with water which in turn functions to wet the surface of the glass or other smooth material, whereby the composition upon hardening becomes firmly adhered thereto. It is clear that other cementitious materials capable of liberating lime when wetted may be substituted for Portland cement. The Portland cement has a marked advantage over the use of lime since it does not have a tendency to carbonate on exposure to the air prior to the time that the composition is employed.

The potassium sulfate in the composition is a set-accelerator. It is obvious that any desired percentages may be employed which will in turn be dependent upon the set characteristics which are desired in the composition. As a general proposition, the amounts of potassium sulfate or other set-accelerator may be varied from about 0.1 to 2.0 per cent.

The composition prepared in accordance with the above indicated formula is very useful as a composition for embedding plate glass prior to the time that it is subjected to polishing and grinding operations. The composition when added to water has a desirable consistency and it readily wets the surface of the glass. When the composition becomes set-hardened by reaction with the water, the composition is very firmly adhered to the glass, whereby the glass is firmly embedded therein.

While a particular embodiment of this invention is shown above, it will be understood, of course, that the invention is not to be limited thereto, since many modifications may be made, and it is contemplated, therefore, by the appended claims, to cover any such modifications as fall within the true spirit and scope of this invention.

I claim:

1. A plate glass setting composition comprising a major proportion by weight of calcined gypsum and minor proportions by weight of a hygroscopic material, Portland cement, and potassium sulfate.

2. A plate glass setting composition comprising principally calcined gypsum having incorporated therewith small amounts of calcium chloride, Portland cement, and potassium sulfate.

3. A plate glass setting composition comprising principally finely divided calcined gypsum having admixed therewith 0.5 to 10.0 per cent of Portland cement, 0.1 to 2.0 per cent of potassium sulfate and less than 1.0 per cent of a hygroscopic material.

4. A plate glass setting composition comprising a mixture of calcined gypsum, Portland cement, potassium sulfate and calcium chloride in the following approximate proportions by weight:

| | Per cent |
|---|---|
| Calcined gypsum | 96.9 to 97.3 |
| Portland cement | 2.5 |
| Potassium sulfate | 0.1 to 0.5 |
| Calcium chloride | 0.1 |

5. A process of setting glass prior to grinding and polishing which comprises embedding said glass in a set-hardenable plaster composition comprising principally water and calcined gypsum having incorporated therewith small quantities of Portland cement, a hygroscopic material and potassium sulfate.

6. A plate glass setting composition comprising principally calcined gypsum having incorporated therewith small amounts of calcium chloride, potassium sulfate, and a substance capable of liberating lime when treated with water.

7. A plate glass setting composition comprising a major proportion by weight of calcined gypsum and minor proportions by weight of a hygroscopic material, potassium sulfate and a substance capable of liberating lime when treated with water.

8. A plate glass setting composition comprising principally calcined gypsum having incorporated therewith small amounts of a hygroscopic material, a set-accelerator, and a substance capable of liberating lime when treated with water.

9. The composition recited in claim 6 wherein said calcined gypsum is calcium sulfate hemihydrate.

10. The composition recited in claim 7 wherein said calcined gypsum is calcium sulfate hemihydrate.

11. The composition recited in claim 8 wherein the calcined gypsum is calcium sulfate hemihydrate.

12. A process of setting glass prior to grinding and polishing which comprises embedding said glass in a set-hardenable plaster composition comprising principally water and calcium sulfate hemihydrate having incorporated therewith small quantities of a hygroscopic material, potassium sulfate and a substance capable of liberating lime when treated with water.

13. A process of setting glass prior to grinding and polishing which comprises embedding said glass in a set-hardenable plaster composition comprising principally water and calcined gypsum having incorporated therewith small quantities of a hygroscopic material, a set-accelerator, and a substance capable of liberating lime when treated wtih water.

JOHN E. WISS.